UNITED STATES PATENT OFFICE.

JOHN HOLLIDAY AND HAYDN M. BAKER, OF BROOKLYN, NEW YORK.

IMPROVEMENT IN PROCESSES FOR REMOVING TIN FROM TIN-SCRAP.

Specification forming part of Letters Patent No. 160,018, dated February 23, 1875; application filed August 11, 1874.

*To all whom it may concern:*

Be it known that we, JOHN HOLLIDAY, of Brooklyn, in Kings county and New York State, and HAYDN M. BAKER, of the same place, have invented a new and useful Process for Recovering the Metallic Tin and Iron from Tin Chips or Scrap; and we hereby declare the following to be a description thereof.

This invention consists in the removal of tin from tin-chips or tin-scrap, obtained as a residue in working tin-plate, by the use of fused alkaline nitrates and other chemical salts, which pass into igneous fusion and retain their chemical constitution at temperatures exceeding the melting-point of metallic tin. It also consists in immersing the chips or scrap in a hot bath of any one of these chemical salts while in a state of fusion until the said salts and chips or scraps are of equal temperature, and then removing and suspending the aforesaid chips or scraps above the caldron or kettle for a short time to permit the chemical to drain off and back into the bath, and subsequently, before the temperature has subsided too low, the said chips or scraps are suddenly plunged into water contained in a suitable vessel for the purpose.

Among the chemicals of common occurrence and moderate cost adapted to this method of working may be named caustic soda and potash, known in chemical language as "sodic and potassic hydrates," and the chlorides of calcium and sodium, besides the sulphates of potash and soda; but our experiments have taught us that the alkaline nitrates afford the best results and most opportunities for making accurate and complete separations.

Some skill and experience are required to successfully conduct the manipulations; therefore, we will make an accurate description of the process to enable others to prosecute the operations by a knowledge obtained from the written record.

We melt a quantity of nitrate of soda in an iron kettle, making a bath whose temperature approximates 800° Fahrenheit. Into this bath a quantity of tin chips or scraps are submerged in the form of bundles, and allowed to remain sufficiently long to attain an equal temperature with the said bath. They are then raised one at a time with a hot fork, and suspended above the bath long enough to allow the fused nitrate to drain off, and subsequently plunged while hot, and above a temperature of 440° Fahrenheit, through a man-hole, into a stout iron tank containing water. They must be tossed or slid into the tank at such an angle as to make their contact with the water, and the consequent explosion, take place out of perpendicular line with the man-hole. This operation disengages most of the tin from the iron, and the said tin falls to the bottom of the tank as feathered or granulated tin.

We must not omit to state that the decomposing or displacement tank has a screen, sieve, or false bottom placed a few inches from the true bottom. This prevents too great a descent of the bundles, and at the same time allows the granulated and liberated tin to fall through the interstices and become more completely separated from the iron.

The bundles are now to be rattled and shaken to release entangled particles of tin and facilitate their descent to the bottom. They are then to be removed and dried, and subsequently knocked, rattled, and shaken to displace more adhering particles of tin. Afterward, the said bundles must be placed in a reverberatory furnace and brought to a red heat. At this stage of the proceedings a small quantity of dry nitrate of soda is thrown in upon the said bundles, and it soon fuses at this temperature, and then decomposes, furnishing oxygen to any adhering tin, thereby forming stannic acid, that immediately combines with the nascent soda, constructing stannate of soda. The whole charge is now to be withdrawn and placed in hot water, which dissolves the stannate of soda, leaving the oxide of iron and metallic iron as precipitants.

The stannate solution may be removed and evaporated to dryness, yielding stannate of soda, or it may be decomposed by an acid, thereby precipitating stannic peroxide, which may subsequently be collected, dried, and reduced to metallic tin with charcoal, by heat. The metallic iron and oxide of iron may, when dried, also be mixed with the requisite quantity of charcoal or coke, and then fused and run off into pigs by the employment of an appropriate furnace.

The feathered or grain tin from the decomposing-tank is collected, melted, and run into bars or ingots at once, furnishing a product representing an acceptable degree of commercial purity.

A large quantity of commercial tin-plate has lead alloyed with the tin, but in this process the lead is converted into litharge in the nitrate bath, where it drops to the bottom of the vessel holding the same. In this transformation a trifle of the nitrate of soda is converted to nitrite, but exposure to air during a specific elevation of temperature restores this last substance to the original composition through the absorption of oxygen. For this reason a relatively small quantity of nitrate of soda is sufficient to cleanse many batches of scrap.

The foregoing is sufficiently plain to enable any person of moderate chemical knowledge and skill to perform the operation.

We claim—

The process of separating the metallic tin from the iron of tin-scrap by heating the said scrap in a bath of fused alkaline nitrate, and then plunging it into water, substantially as described.

JOHN HOLLIDAY.
HAYDN M. BAKER.

Witnesses:
W. GREEN,
THEO. E. GREEN.